Patented Aug. 17, 1943

2,326,966

UNITED STATES PATENT OFFICE 2,326,966

SEAM SEALING COMPOUND

Lawrence A. O'Leary, San Mateo, Calif., assignor to W. P. Fuller & Co., San Francisco, Calif., a corporation of California No Drawing. Application October 9, 1940, Serial No. 360,409

7 Claims. (Cl. 220—81)

This invention relates to seam sealing compounds adapted for sealing the seams of cans which are used to pack materials such as cleaning fluids, aromatic and aliphatic hydrocarbons, fruit juices, fruits, vegetables, vegetable and mineral oils, etc.

In the past the principal materials employed for this purpose have consisted essentially of aqueous dispersions of rubber. These compounds are applied to the seams of metal containers, such as those made from tin plate before the seam is compressed and in this way make impervious joints between the different parts of the container.

It has now been found that certain of the softer alkyd resins when compounded with various mineral or organic fillers and a modifying agent such as an organic or inorganic derivative of cellulose are excellent materials for sealing the seams of metal containers. These sealing compositions are impervious to hydrocarbons, water, vegetable oils, etc., and are not susceptible to oxidation when exposed to atmospheric conditions so that they retain their initial plastic and adhesive properties over long periods of time. These compounds adhere extremely well to metal surfaces, particularly smooth surfaces such as tin plate.

The alkyd resins from which the sealing compounds are prepared are made from polyhydric alcohols such as glycerine, polyglycerines, glycols, on the one hand, and polybasic acids containing six or more carbon atoms, such as adipic, suberic, sebacic and higher aliphatic dibasic acids, all of which yield soft, rubbery, more or less tacky resins when condensed with the polyhydric alcohols. Mixtures of the polyhydric alcohols may be used as may also mixtures of the dibasic acids. If somewhat harder resins are desired for some purposes, part of the dibasic acid may be replaced by phthalic acid or an aliphatic dibasic acid containing fewer carbon atoms than those listed above, for example, malonic or succinic acids.

The organic or inorganic filler may be magnesium silicate, barytes, whiting, starch, wood flour, corn protein resin, soya protein resins, casein. These may be employed individually or two or more may be used simultaneously. Magnesium silicate is the preferred filler. The amount of filler employed will depend on the nature of the resin, larger amounts being employed with the softer resins in order to reduce the cold flow of the compound so that it will remain in the seam in hot weather. Generally the amount of filler will vary between 50 and 150% of the weight of the resin.

The modifying agent is usually a derivative of cellulose which is compatible with the resin. Suitable derivatives are cellulose nitrate, cellulose acetate, cellulose propionate, cellulose acetobutyrate, ethyl cellulose, benzyl cellulose, etc. The function of the cellulose derivative is to reduce the tackiness of the mixture and to reduce cold flow. The tackiness of the pure resin may be reduced somewhat without interfering appreciably with the ability of the compound to adhere to the metal surface, particularly when the final seal is made by mechanical compression, because the compounds employed are all pressure sensitive adhesives. The amount of cellulose derivative may be varied considerably depending on the nature of the resin and will usually be from 10–15% of the weight of the resin.

The compound is applied to the edges of the container where the seal is to be made, in the form of a solution in which the organic or inorganic filler is suspended. Low boiling solvents are preferred on account of their ready volatility. Suitable solvents are acetone, methyl ethyl ketone, methylisobutyl ketone, ethyl acetate, isopropyl acetate, butyl acetate, and the monomethyl ether of ethylene glycol. The ratio of solvent to the remaining ingredients is determined by the consistency required in the mixture to assure the application of the proper amount of dry sealing composition. Depending on ratio of resin to filler and viscosity of the resin the amount of solvent employed will vary from about 200 to about 300% of weight of the resin.

The invention may be illustrated by the following example:

*Example.*—A mixture consisting of 186 lb. of a glyceryl sebacate resin, 186 lb. of magnesium silicate, 29 lb. of cellulose nitrate (commercial material wet with alcohol) and 74 gal. of acetone was ground in a ball mill until the resin and cellulose nitrate were completely dissolved and the magnesium silicate thoroughly dispersed. This solution is then employed in the usual manner for sealing the seams of metal containers.

The glyceryl sebacate resin in the foregoing example may be made according to the process described in U. S. Patent 1,779,367. Other resins made by a similar process from the polyhydric alcohols and dibasic acids enumerated above may be used to replace the glyceryl sebacate.

The proportions of ingredients may be varied within the limits set forth above.

I claim:

1. A seam sealing compound comprising a glyceryl-sebacate resin, from 50 to 150 per cent of a filler, from 10 to 15 per cent of cellulose nitrate, and from 200 to 300 per cent of a volatile resin solvent, calculated on the weight of the resin.

2. A seam sealing compound comprising a glyceryl-sebacate resin, from 50 to 150 per cent of a filler, from 10 to 15 per cent of cellulose nitrate, and from 200 to 300 per cent of acetone, calculated on the weight of the resin.

3. A metal container having a seamed joint and having a plastic and adhesive sealing compound in the joint comprising a mixture of a glyceryl sebacate resin, from 50 to 150 per cent of a filler and from 10 to 15 per cent of cellulose nitrate.

4. A seam sealing compound comprising an alkyd resin derived from a polyhydric alcohol and a member of a group consisting of adipic, suberic and sebacic acids, from 50 to 150 per cent of a magnesium silicate, from 10 to 15 per cent of a derivative of cellulose selected from a group consisting of cellulose nitrate, cellulose acetate, cellulose propionate, cellulose aceto-butyrate, ethyl cellulose and benzyl cellulose, and from 200 to 300 per cent of a volatile resin solvent calculated on the weight of the resin.

5. A seam sealing compound comprising a glyceryl sebacate resin, from 50 to 150 per cent of magnesium silicate, from 10 to 15 per cent of a derivative of cellulose selected from a group consisting of cellulose nitrate, cellulose acetate, cellulose propionate, cellulose aceto-butyrate, ethyl cellulose and benzyl cellulose, and from 200 to 300 per cent of a volatile resin solvent calculated on the weight of the resin.

6. A seal sealing compound comprising an alkyd resin derived from a polyhydric alcohol and a member of a group consisting of adipic, suberic, and sebacic acids, from 50 to 150 per cent of magnesium silicate, from 10 to 15 percent of cellulose nitrate, and from 200 to 300 per cent of a volatile resin solvent calculated on the weight of the resin.

7. A metal container having a seamed joint and having a plastic and adhesive sealing compound in the joint comprising a mixture of an alkyd resin derived from a polyhydric alcohol and a member of a group consisting of adipic, suberic and sebasic acids, from 50 to 150 per cent of magnesium silicate, and from 10 to 15 per cent of a derivative of cellulose selected from a group consisting of cellulose nitrate, cellulose acetate, cellulose propionate, cellulose aceto-butyrate, ethyl cellulose and benzyl cellulose.

LAWRENCE A. O'LEARY.